US011158336B2

(12) United States Patent
Hardek

(10) Patent No.: US 11,158,336 B2
(45) Date of Patent: *Oct. 26, 2021

(54) DISTINGUISHING USER SPEECH FROM BACKGROUND SPEECH IN SPEECH-DENSE ENVIRONMENTS

(71) Applicant: Vocollect, Inc., Pittsburgh, PA (US)

(72) Inventor: David D. Hardek, Allison Park, PA (US)

(73) Assignee: VOCOLLECT, INC., Pittsburgh, PA (US)

(*) Notice: Subject to any disclaimer, the term of this patent is extended or adjusted under 35 U.S.C. 154(b) by 59 days.

This patent is subject to a terminal disclaimer.

(21) Appl. No.: 16/695,555

(22) Filed: Nov. 26, 2019

(65) Prior Publication Data

US 2020/0098387 A1    Mar. 26, 2020

Related U.S. Application Data

(63) Continuation of application No. 15/220,584, filed on Jul. 27, 2016, now Pat. No. 10,714,121.

(51) Int. Cl.
*G10L 25/84* (2013.01)
*G10L 25/51* (2013.01)
(Continued)

(52) U.S. Cl.
CPC ............ *G10L 25/84* (2013.01); *G10L 15/063* (2013.01); *G10L 15/07* (2013.01); *G10L 15/16* (2013.01);
(Continued)

(58) Field of Classification Search
CPC ......... G10L 25/84; G10L 15/16; G10L 15/07; G10L 25/51; G10L 15/063; G10L 2025/783
(Continued)

(56) References Cited

U.S. PATENT DOCUMENTS 6,832,725 B2   12/2004   Gardiner et al.
7,128,266 B2   10/2006   Zhu et al.
(Continued)

FOREIGN PATENT DOCUMENTS

WO    2013/163789 A1    11/2013
WO    2013/173985 A1    11/2013
(Continued)

OTHER PUBLICATIONS

T. B. Martin, "Practical applications of voice input to machines," in Proceedings of the IEEE, vol. 64, No. 4, pp. 487-501, Apr. 1976, doi: 10.1109/PROC.1976.10157. (Year: 1976).*
(Continued)

*Primary Examiner* — Bharatkumar S Shah
(74) *Attorney, Agent, or Firm* — Alston & Bird LLP

(57) ABSTRACT

A device, system, and method whereby a speech-driven system can distinguish speech obtained from users of the system from other speech spoken by background persons, as well as from background speech from public address systems. In one aspect, the present system and method prepares, in advance of field-use, a voice-data file which is created in a training environment. The training environment exhibits both desired user speech and unwanted background speech, including unwanted speech from persons other than a user and also speech from a PA system. The speech recognition system is trained or otherwise programmed to identify wanted user speech which may be spoken concurrently with the background sounds. In an embodiment, during the pre-field-use phase the training or programming may be accomplished by having persons who are training listeners audit the pre-recorded sounds to identify the desired user speech. A processor-based learning system is trained to duplicate the assessments made by the human listeners.

20 Claims, 6 Drawing Sheets

(51) Int. Cl.
  *G10L 15/07* (2013.01)
  *G10L 15/06* (2013.01)
  *G10L 15/16* (2006.01)
  *G10L 25/78* (2013.01)

(52) U.S. Cl.
  CPC ........ *G10L 25/51* (2013.01); *G10L 2025/783* (2013.01)

(58) Field of Classification Search
  USPC .................................................... 704/9, 232
  See application file for complete search history.

(56) References Cited

U.S. PATENT DOCUMENTS

| | | |
|---|---|---|
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,490,877 B2 | 7/2013 | Kearney |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| D716,285 S | 10/2014 | Chaney et al. |
| 8,851,383 B2 | 10/2014 | Yeakley et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,925,818 B2 | 1/2015 | Kosecki et al. |
| 8,939,374 B2 | 1/2015 | Jovanovski et al. |
| 8,942,480 B2 | 1/2015 | Ellis |

(56) References Cited

U.S. PATENT DOCUMENTS

| | | |
|---|---|---|
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,070,032 B2 | 6/2015 | Corcoran |
| D734,339 S | 7/2015 | Zhou et al. |
| D734,751 S | 7/2015 | Oberpriller et al. |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,664 B2 | 2/2016 | Soule et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey et al. |
| 9,342,827 B2 | 5/2016 | Smith |
| 9,355,294 B2 | 5/2016 | Smith et al. |
| 9,367,722 B2 | 6/2016 | Xian et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,407,840 B2 | 8/2016 | Wang |
| 9,412,242 B2 | 8/2016 | Van et al. |
| 9,418,252 B2 | 8/2016 | Nahill et al. |
| D766,244 S | 9/2016 | Zhou et al. |
| 9,443,123 B2 | 9/2016 | Hejl |
| 9,443,222 B2 | 9/2016 | Singel et al. |
| 9,448,610 B2 | 9/2016 | Davis et al. |
| 9,478,113 B2 | 10/2016 | Xie et al. |
| D771,631 S | 11/2016 | Fitch et al. |
| 9,507,974 B1 | 11/2016 | Todeschini |
| D777,166 S | 1/2017 | Bidwell et al. |
| 9,582,696 B2 | 2/2017 | Barber et al. |
| D783,601 S | 4/2017 | Schulte et al. |
| 9,616,749 B2 | 4/2017 | Chamberlin |
| 9,618,993 B2 | 4/2017 | Murawski et al. |
| D785,617 S | 5/2017 | Bidwell et al. |
| D785,636 S | 5/2017 | Oberpriller et al. |
| D790,505 S | 6/2017 | Vargo et al. |
| D790,546 S | 6/2017 | Zhou et al. |
| D790,553 S | 6/2017 | Fitch et al. |
| 9,715,614 B2 | 7/2017 | Todeschini et al. |
| 9,734,493 B2 | 8/2017 | Gomez et al. |
| 9,786,101 B2 | 10/2017 | Ackley |
| 9,857,167 B2 | 1/2018 | Jovanovski et al. |
| 9,891,912 B2 | 2/2018 | Balakrishnan et al. |
| 9,892,876 B2 | 2/2018 | Bandringa |
| 9,954,871 B2 | 4/2018 | Hussey et al. |
| 9,978,088 B2 | 5/2018 | Pape |
| 10,007,112 B2 | 6/2018 | Fitch et al. |
| 10,019,334 B2 | 7/2018 | Caballero et al. |
| 10,021,043 B2 | 7/2018 | Sevier |
| 10,038,716 B2 | 7/2018 | Todeschini et al. |
| 10,066,982 B2 | 9/2018 | Ackley et al. |
| 10,327,158 B2 | 6/2019 | Wang et al. |
| 10,360,728 B2 | 7/2019 | Venkatesha et al. |
| 10,401,436 B2 | 9/2019 | Young et al. |
| 10,410,029 B2 | 9/2019 | Powilleit |
| 2007/0063048 A1 | 3/2007 | Havens et al. |
| 2008/0185432 A1 | 8/2008 | Caballero et al. |
| 2009/0134221 A1 | 5/2009 | Zhu et al. |
| 2009/0164902 A1* | 6/2009 | Cohen ................ G10H 1/0025 715/716 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0265880 A1 | 10/2010 | Rautiola et al. |
| 2011/0119623 A1 | 5/2011 | Kim |
| 2011/0169999 A1 | 7/2011 | Grunow et al. |
| 2011/0202554 A1 | 8/2011 | Powilleit et al. |
| 2011/0208521 A1* | 8/2011 | McClain ................ G10L 17/26 704/233 |
| 2012/0111946 A1 | 5/2012 | Golant |
| 2012/0168511 A1 | 7/2012 | Kotlarsky et al. |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |

(56) References Cited

U.S. PATENT DOCUMENTS

| | | |
|---|---|---|
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0097249 A1 | 4/2014 | Gomez et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | Digregorio |
| 2014/0278391 A1 | 9/2014 | Braho et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0060544 A1 | 3/2015 | Feng et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |

(56) References Cited

U.S. PATENT DOCUMENTS

| | | |
|---|---|---|
| 2015/0161429 A1 | 6/2015 | Xian |
| 2015/0169925 A1 | 6/2015 | Chen et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1* | 5/2016 | Braho .................. G10L 15/065 704/251 |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2016/0377414 A1 | 12/2016 | Thuries et al. |
| 2017/0011735 A1* | 1/2017 | Kim ....................... G10L 15/005 |

FOREIGN PATENT DOCUMENTS

| | | |
|---|---|---|
| WO | 2014/019130 A1 | 2/2014 |
| WO | 2014/110495 A1 | 7/2014 |

OTHER PUBLICATIONS

T. B. Martin, "Practical applications of voice input to machines," in Proceedings of the IEEE, vol. 64, No. 4, pp. 487-501, Apr. 1976, doi: 10.1109/PROC.1976.10157. (Year: 1976) (Year: 1976).*

Examiner initiated interview summary (PTOL-413B) dated Sep. 14, 2018 for U.S. Appl. No. 15/220,584.

Final Rejection dated Jun. 5, 2019 for U.S. Appl. No. 15/220,584.

Non-Final Rejection dated Mar. 1, 2019 for U.S. Appl. No. 15/220,584.

Notice of Allowance and Fees Due (PTOL-85) dated Mar. 11, 2020 for U.S. Appl. No. 15/220,584.

Notice of Allowance and Fees Due (PTOL-85) dated Sep. 4, 2019 for U.S. Appl. No. 15/220,584.

Requirement for Restriction/Election dated Sep. 14, 2018 for U.S. Appl. No. 15/220,584.

U.S. Patent Application for a Laser Scanning Module Employing an Elastomeric U-Hinge Based Laser Scanning Assembly, filed Feb. 7, 2012 (Feng et al.), U.S. Appl. No. 13/367,978.

U.S. Patent Application for Indicia Reader filed Apr. 1, 2015 (Huck), U.S. Appl. No. 14/676,109.

U.S. Patent Application for Multifunction Point of Sale Apparatus With Optical Signature Capture filed Jul. 30, 2014 (Good et al.), U.S. Appl. No. 14/446,391.

U.S. Patent Application for Multipurpose Optical Reader, filed May 14, 2014 (Jovanovski et al.); 59 pages; now abandoned., U.S. Appl. No. 14/277,337.

U.S. Patent Application for Terminal Having Illumination and Focus Control filed May 21, 2014 (Liu et al.), U.S. Appl. No. 14/283,282.

Applicant Initiated Interview Summary (PTOL-413) dated Jun. 15, 2020 for U.S. Appl. No. 15/220,584.

Notice of Allowance and Fees Due (PTOL-85) dated Jun. 15, 2020 for U.S. Appl. No. 15/220,584.

U.S. Appl. No. 15/220,584, filed Jul. 24, 2016, Pending.

* cited by examiner

Exemplary Method of Pre-Processing for Training Corpus, Audio Characterization Model, and Rejection Threshold

DISTINGUISHING USER SPEECH FROM BACKGROUND SPEECH IN SPEECH-DENSE ENVIRONMENTS

CROSS-REFERENCE TO RELATED APPLICATION(S)

This application is a continuation of and claims the benefit of priority to U.S. application Ser. No. 15/220,584 entitled "DISTINGUISHING USER SPEECH FROM BACKGROUND SPEECH IN SPEECH-DENSE ENVIRONMENTS" filed on Jul. 27, 2016, the entirety of which is incorporated by reference herein.

FIELD OF THE INVENTION

The present invention relates to a method and apparatus for recognition of human speech, and more particularly, to a method and apparatus to distinguish user speech which is the desired focus of machine-interpretation from extraneous background speech.

BACKGROUND

In modern production environments, it is increasingly desirable for human operators to be able to record data and to control electronic devices in a "hands-free" mode, typically via speech control. This typically entails the use of portable electronic voice-processing devices which can detect human speech, interpret the speech, and process the speech to recognize words, to record data, and/or to control nearby electronic systems.

Voice-driven systems typically include at least one microphone and at least one processor-based device (e.g., computer system) which is operated in response to human voice or spoken input, for instance spoken commands and/or spoken information.

There are numerous applications in which voice-driven systems may be employed. For instance, there are many applications where it is advantageous for a user to have their hands free to perform tasks other than operating a keyboard, keypad, mouse, trackball or other user input device. An example of one such application is a warehouse, where a user may need to handle items such as boxes while concurrently interacting with a processor-based device. Another example application is a courier or delivery person, who may be handling parcels or driving a vehicle while concurrently interacting with a processor-based device. An example of a further such application is a medical care provider, who may be using their hands during the performance of therapeutic or diagnostic medical services, while concurrently interacting with a processor-based device. There are of course numerous other examples of applications.

In many of these exemplary applications it is also advantageous or even necessary for the user to be mobile. For applications in which mobility is desirable, the user may wear a headset and a portable processor-based device (referred to below in this document at the speech recognition device 106, 300, or SRD). The headset typically includes at least one loud-speaker and/or microphone. The portable processor-based device typically takes the form of a wearable computer system. The headset is communicatively coupled to the portable processor-based device, for instance via a coiled wire or a wireless connection, for example, a Bluetooth connection. In some embodiments, the portable processor-based device may be incorporated directly into the headset.

In some applications, the portable processor-based device may in turn be communicatively coupled to a host or backend computer system (e.g., server computer). In many applications, two or more portable processor-based devices (clients) may be communicatively coupled to the host or backend computer system/server.

The server may function as a centralized computer system providing computing and data-processing functions to various users via respective portable processor-based devices and headsets. Such may, for example, be advantageously employed in an inventory management system in which a central or server computer system performs tracking and management; a plurality of users each wearing respective portable computer systems and headsets interface with the central or server computer system.

This client (headset)/server approach allows the user(s) to receive audible instructions and/or information from the server of the voice driven system. For instance, the user may: receive from the server voice instructions; may ask questions of the server; may provide to the server reports on progress of their assigned tasks; and may also report working conditions, such as inventory shortages, damaged goods or parcels; and/or the user may receive directions such as location information specifying locations for picking up or delivering goods.

Background Sounds

Voice driven systems are often utilized in noisy environments where various extraneous sounds interfere with voice or spoken input. For example, in a warehouse or logistics center environment, extraneous sounds are often prevalent, including for instance: public address announcements; conversations from persons which are not intended as input (that is, persons other than the user of the voice driven system); and/or the movement of boxes or pallets; noise from the operation of lift vehicles (e.g., forklifts), motors, compressors, and other nearby machinery. To be effective, voice driven systems need to distinguish between voice or speech as intended input and extraneous background sounds, including unwanted voices, which may otherwise be erroneously interpreted as desired speech from a headset-wearing user.

Sounds or noise associated with public address (PA) systems are particularly difficult to address. Public address systems are intentionally loud, so that announcements can be heard above other extraneous noise in the ambient environment. Therefore, it is very likely that a headset microphone will pick up such sounds. Additionally, public address system announcements are not unintelligible noise, but rather are typically human voice or spoken, thereby having many of the same aural qualities as voice or spoken input.

Therefore, there exists a need for a system and method for addressing extraneous sounds including background speech and PA system speech, in order to prevent those extraneous sounds from interfering with the desired operation of the voice driven systems.

SUMMARY

Accordingly, in one aspect, the present system and method solves the problem by preparing, in advance of field-use, a voice-data model which is created in a training environment, where the training environment exhibits both desired user speech and unwanted background sounds, including unwanted speech from persons other than a user, and also unwanted speech from a PA system.

The speech recognition system is trained or otherwise programmed to identify wanted user speech which may be spoken concurrently with the background sounds. In an embodiment, during the pre-field-use phase the training or programming is accomplished in part by having persons who are training listeners audit the pre-recorded sounds, and having the training listeners identify the desired user speech, a process referred to as "tagging". Tagging may also entail have the training listeners identify background speech from persons other than the user, background speech from PA system sounds, and other environmental noises. In an embodiment, during the pre-field-use phase the training or programming is further accomplished in part by training a processor-based learning system to duplicate the assessments made by the human listeners.

DETAILED DESCRIPTION

In the following description, certain specific details are set forth in order to provide a thorough understanding of various embodiments. However, one skilled in the art will understand that the invention may be practiced without these details. In other instances, well-known structures associated with voice recognition systems and speech recognition devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Electronic System for Voice Processing

The present system and method embraces electronic devices designed to interpret human speech and language, and to operate in response to human speech, also known as voice-driven systems, speech-driven systems, or spoken-language recognition systems.

Figure 1:
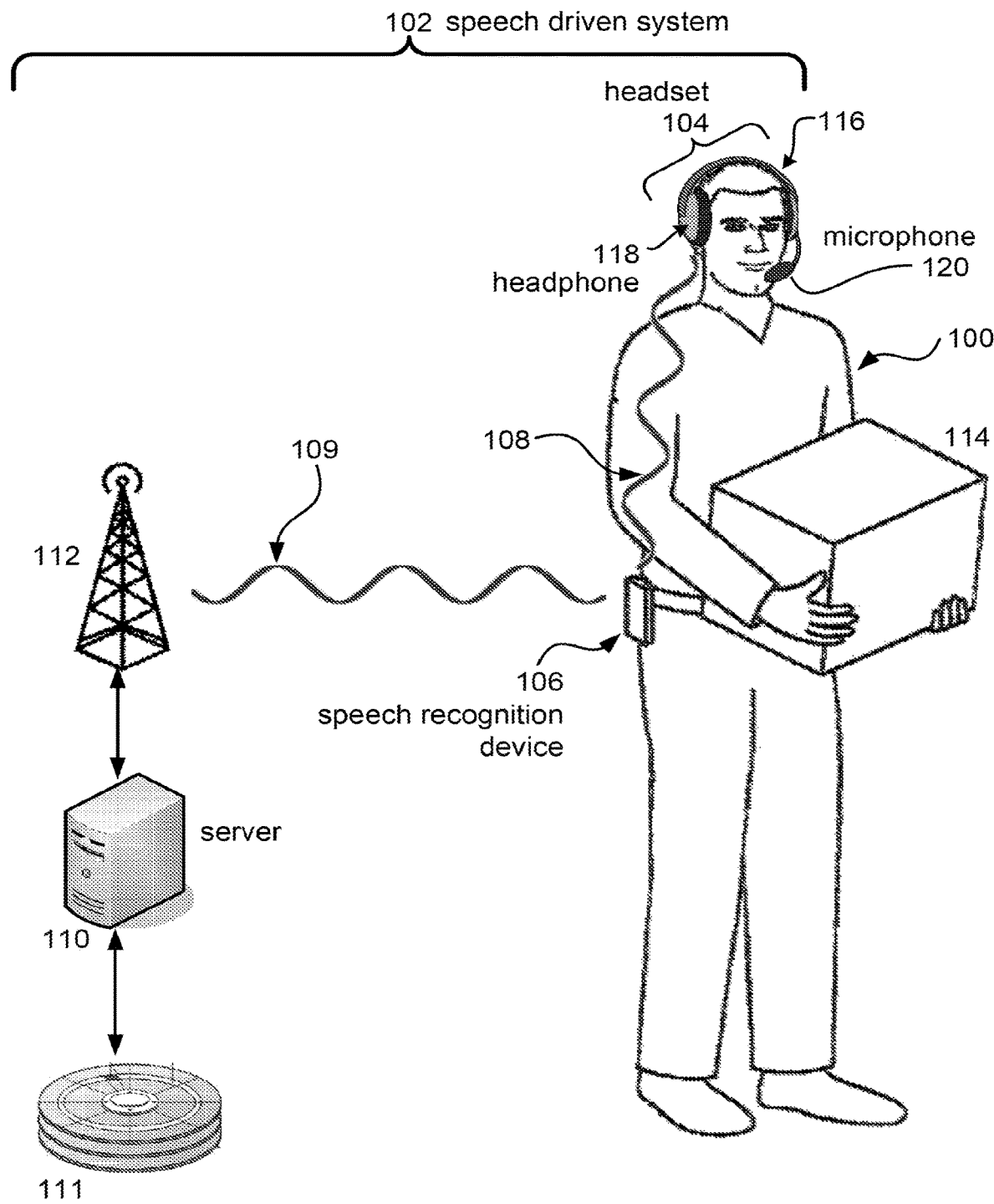
FIG. 1 is a view of an exemplary speech-driven system according to one exemplary embodiment of the present system and method.

FIG. 1 shows a user 100 interacting with an exemplary speech driven system 102, according to one embodiment of the present system and method.

In particular, the speech driven system 102 includes a headset 104 and a processor-based speech recognition device 106. In use, the user typically wears the headset 104, and optionally wears the processor-based speech recognition device 106. The processor-based speech recognition device 106 is communicatively coupled, either directly or indirectly (that is, via either wired or wireless coupling), with the headset 104. For example, the processor-based speech recognition device 106 and headset 104 may be wirelessly communicatively coupled via one or more radios (e.g., transmitters, receivers, transceivers) as indicated by radio frequency signal 108. Alternatively, the processor-based speech recognition device 106 and headset 104 may be communicatively coupled via one or more cables, for instance one or more wire or optical cables (not shown).

Optionally, the speech driven system 102 may also include one or more backend computer systems 110 (only one shown), which may include or be communicatively coupled to one or more data stores stored on one or more non-transitory computer- or processor-readable media 111. The backend computer system(s) 110 is or are communicatively coupled to one or more processor-based speech recognition devices 106. For example, a wireless networking system may include one or more antennas 112 (only one shown) positioned about a work environment. Antenna 112 can provide wireless communications (for example, by radio frequency signal 109) between the one or more processor-based speech recognition devices 106 and the one or more backend computer system(s) 110.

The user 100 may engage in various activities which may require the use of the user's hands, for instance to handle goods or packages 114. Alternatively, the activities may not require use of the user's hands; however hand-free operation may be more comfortable or otherwise advantageous to the user 100.

The headset 104 may include a headband 116, one or more loud-speakers or headphones 118 (only one visible in FIG. 1), one or more microphones 120 (one visible in FIG. 1), and internal circuitry (not illustrated). The headband 116 allows the headset 104 to be securely worn by the user 100, and positions the loud-speakers 118 at least proximate one ear or next to each ear of the user 100. The microphone 120 may be positioned proximate and oriented toward a mouth of the user 100 when the headset 104 is worn.

The circuitry (not shown in FIG. 1) of the headset 104 may incorporate audio processing circuits such as audio filters and correlation circuitry associated with speech detection and/or speech recognition.

The processor-based speech recognition device 106 may be portable or stationary. For example, the processor-based speech recognition device 106 may be worn by the user 100, for instance on a belt as illustrated in FIG. 1. This allows the headset 104 to use relatively short range wireless communications devices, for instance Bluetooth radios, while ensuring that communications between the headset 104 and the processor-based speech recognition devices 106 is maintained during normal use.

Alternatively, the processor-based speech recognition device 106 may be manually carried or otherwise transported, for instance on a vehicle (e.g., fork lift, tug). Alternatively or additionally, the processor-based speech recognition device 106 may be stationary. Such implementations may employ a plurality of antennas positioned throughout a work environment and/or sufficiently more powerful communications devices, for instance WiFi radios.

The circuitry (not shown in FIG. 1) of the processor-based speech recognition device 106 may incorporate audio processing circuits for tasks such noise suppression and modeling, features vector generation, decoding, and other circuitry associated with speech detection and/or speech recognition.

The headset 104 and processor-based speech recognition device 106 permit various users 100 to communicate with one or more backend computer systems 110 (e.g., server computer systems). In use, the processor-based speech recognition device 106 receives digital instructions from the backend computer system 110 and converts those instructions to audio, which is provided to the user 100 via loud-speakers 118 of the headset 104. The user 100 provides spoken input via the microphone 120 of the headset, which the processor-based speech recognition device 106 may convert to a digital format (e.g., words, text, or encoding symbolic of words and text) to be transferred to the backend computer system 110.

The backend computer system(s) 110 may be part of a larger system for sending and receiving information regarding the activities and tasks to be performed by the user(s) 100. The backend computer system(s) 110 may execute one or more system software routines, programs or packages for handling particular tasks. Tasks may, for example, include tasks related to inventory and warehouse management.

In an alternative embodiment of the present system and method, the backend computer system(s) 110 may implement some, or all, of the functionality otherwise described herein as being associated with the processor-based speech recognition device 106.

The backend computer system/server 110 may be any targeted computer or automated device, and may be located anywhere with respect to the user and the various components. For instance, the backend computer system 110 will typically be located remotely from the user, such as in another room or facility.

However, the background computer system 110 may be located locally with the user, for instance carried or worn by the user or carried by a vehicle operated by the user. In some implementations, that backend computer system 110 may be combined with the processor-based speech recognition device 106.

In an alternative embodiment, the headset 104 and the speech recognition devise (SRD) 106 may be connected and may communicate via a wired connection, such as a coiled cable.

Headset

Figure 2:
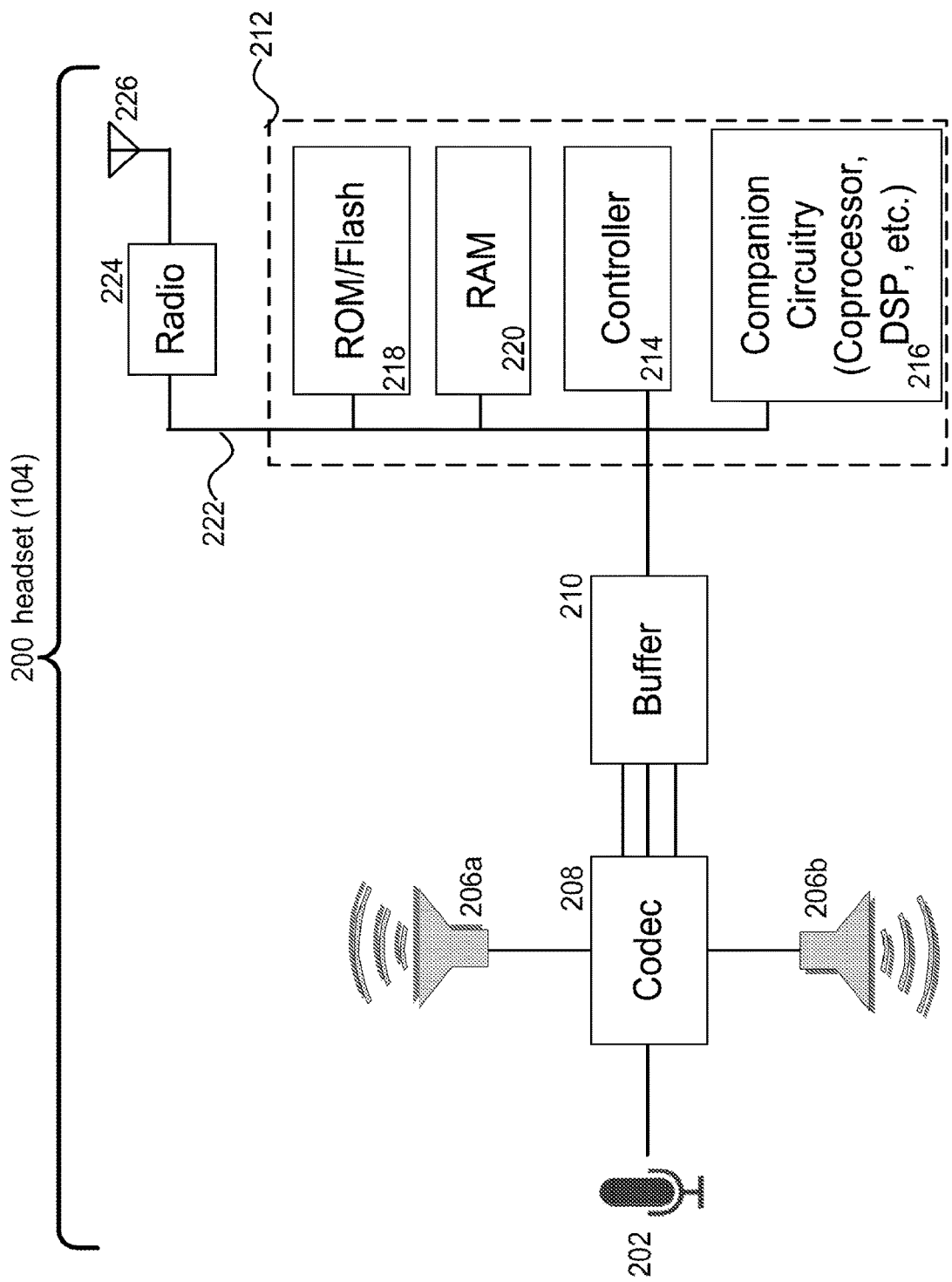
FIG. 2 is a system diagram of a headset identical or similar to that of FIG. 1, according to one exemplary embodiment of the present system and method.

FIG. 2 shows some of the components of an exemplary headset 200, according to one exemplary embodiment of the present system and method. The headset 200 may be similar or even identical to the exemplary headset 104 of FIG. 1.

The headset 200 includes a microphone 202, and may include one or more secondary microphones (not shown). The microphone 202 is operable as a transducer to convert acoustic energy (e.g., sounds, such as voice or other sounds) to analog signals (e.g., voltages, currents) that have respective signal levels. The headset 200 preferably includes one or more loud-speakers 206a, 206b (two shown, collectively 206). Each of the loud-speakers 206 is operable as a transducer to convert analog signals (e.g., voltages, currents) that have respective signal levels into acoustic energy (e.g., sounds, such as recorded or artificially generated spoken syllables, words or phrases or utterances).

The microphone(s) 202 is (are) positioned or configured (e.g., directional and oriented) to primarily capture speech or utterances by the user 100. However, the microphone 202 may also capture background speech from other users in the work environment, as well as background speech from PA systems. In this document, background speech will be understood to include both speech from persons other than the user 100 and Public Address (PA) system speech.

The microphone 202 may be positioned such that when the headset 104 (FIG. 1) is worn by a user 100, the microphone 202 is positioned close to the mouth of the user 100. For example, the microphone 202 may be carried at an end of an arm/boom of the headset 104 (FIG. 1), positioning the primary microphone 202 proximate to the mouth of the user 100. Consequently, the speech sounds or utterances by the user 100 are typically louder, as recorded at the microphone 202, than background speech sounds from other persons who are some distance from the microphone 202.

With respect to PA systems, background speech from a PA system may be amplified, and so may be picked up by the microphone 202 as being approximately as loud as the user speech. However, due to various factors—emanating from a remote loud-speaker, frequency band limitations of the PA system, and due to echoes and other factors—remote speech from a PA system may have different acoustic qualities at the microphone 202, as compared to the acoustic qualities of user speech.

In other words, user speech or other utterances by the user 100 are likely to have different acoustic signatures than background speech from other persons at some distance from the user 100, or and also different acoustic signatures from sounds from a PA system. In one embodiment, the present system and method may rely, in part or in whole, on signal processing techniques, as applied to such acoustic differences, to distinguish user speech from background speech.

In an alternative embodiment, some implementations of the present system and method may employ additional secondary microphones (not shown), for example two or more secondary microphones, to help distinguish user speech from background speech.

The headset 200 may include one or more audio coder/decoders (CODECs). For example, the headset 200 may include an audio CODEC 208 coupled to the microphone(s) 202 to process analog signals from the microphone 202 and produce digital signals representative of the analog signals. The CODEC 208 or another audio CODEC (not shown) may be coupled to the one or more loud-speakers 206 to produce analog drive signals from digital signals in order to drive the loud-speakers 206. Suitable audio CODECs may for example include the audio CODEC commercially available from Philips under the identifier UDA 1341 and other similar audio CODECs.

The headset 200 may include one or more buffers 210. The buffer(s) 210 may temporarily store or hold signals. The buffer 210 is illustrated as positioned relatively downstream of the CODEC 208 in a signal flow from the microphone 202.

The headset 200 includes a control subsystem 212. The control subsystem 212 may, for example include one or more controllers 214, one or more sets of companion circuitry 216, and one or more non-transitory computer- or processor-readable storage media such a non-volatile memory 218 and volatile memory 220.

The controller(s) 214 may take a variety of forms, for instance one or more microcontrollers, microprocessors, digital signal processors (DSPs), application specific integrated circuits (ASICs), programmable gate arrays (PGAs), graphical processing unit (CPUs) and/or programmable logic controllers (PLCs). The controller(s) 214 may, for example, take the form of a processor commercially available from CSR under the identifier BlueCore5 Multimedia. The BlueCore5 Multimedia does not require companion circuitry 216. Alternatively, the controller(s) 214 may take the form of a processor commercially available from Intel under the identifier SA-1110. Optional companion circuitry 216 may take the form of one or more digital, or optionally analog, circuits, which may, or may not, be in the form of one or more integrated circuits. The companion circuitry 216 may, for example, take the form of a companion chip commercially available from Intel under the identifier SA-1111. The controller(s) 214 may function as a main processor, with the companion circuitry functioning as a co-processor to handle specific tasks. In some implementations, the companion circuitry 216 may take the form of one or more DSPs or GPUs.

Non-volatile memory 218 may take a variety of forms, for example one or more read only memories (ROMs), one or more writeable memories, for instance EEPROM and/or one or more FLASH memories. The volatile memory 220 may take a variety of forms, for example one or more random access memories (RAM) including static random access memory (SRAM) and/or dynamic random access memories (DRAM) for instance synchronous DRAM (SDRAM)). The various controllers 214, companion circuits 216, volatile memories 218 and/or nonvolatile memories 220 may be communicatively coupled via one or more buses (only one shown) 222, for instance instructions buses, data buses, address buses, power buses, etc.

The controllers 214 and/or companion circuitry 216 may execute instructions stored in or by the non-volatile memories 218 and/or volatile memories 220. The controllers 214 and/or companion circuitry 216 may employ data, values, or other information stored in or by the volatile memories 220 and/or nonvolatile memories 218.

In an embodiment of the present system and method, the control subsystem 212 may incorporate audio filtering circuitry or implement audio filtering by way of a general purpose processor which processes suitable instructions stored in non-volatile memory 218 or volatile memory 220. Audio filtering may, for example, implement signal processing or data comparisons as described further herein to distinguish acceptable user speech from background user speech. Audio filtering may rely upon a comparison of frames of speech provided from microphone 202, via codec 208 and buffer 210, with previously-established speech samples stored in non-volatile memory 218 or volatile memory 220.

Figure 3:
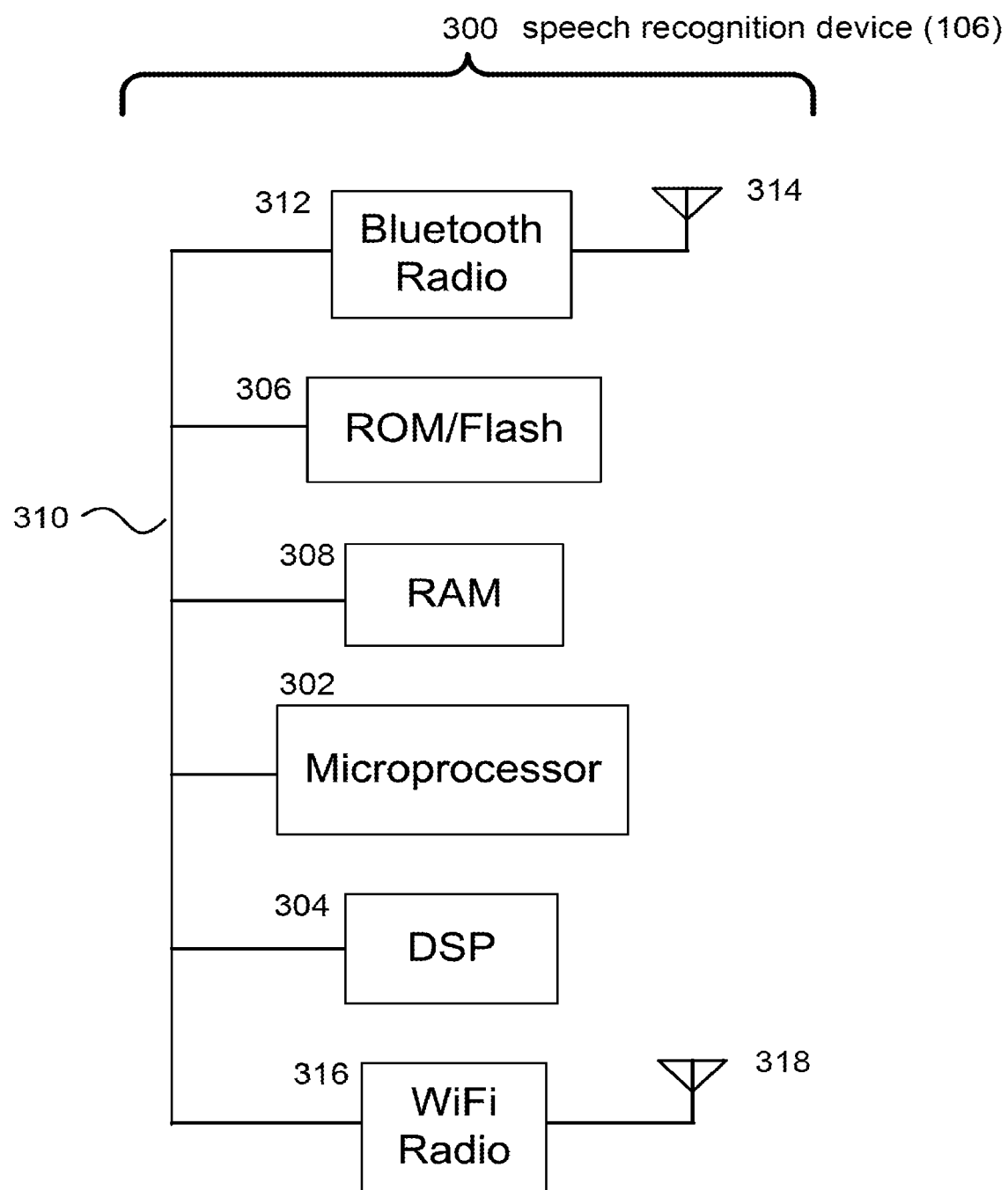
FIG. 3 is a system view of a speech recognition device identical or similar to that of FIG. 1, according to one exemplary embodiment of the present system and method.

In an alternative embodiment of the present system and method, some or all audio filtering, speech-processing, and speech-comparisons may be instead be accomplished via circuitry on the speech recognition device 106 (FIG. 1), 300 (FIG. 3). In an alternative embodiment, some or all audio filtering may be distributed between hardware and/or software of the headset 104, 200, and hardware and/or software of the speech recognition device 106, 300.

As described further herein below, in an embodiment of the present system and method, the sound signal from the microphone 202 is passed to the processor-based speech recognition device 106 (FIG. 1), 300 (FIG. 3) for speech recognition processing. The process of discriminating between user speech and background speech is then performed by the speech recognition device 106, 300.

The headset 200 optionally includes one or more radios 224 (only one shown) and associated antennas 226 (only one shown) operable to wirelessly communicatively couple the headset 200 to the processor-based speech recognition device 106 and/or backend computer system 110. The radio 224 and antenna 226 may take a variety of forms, for example a wireless transmitter, wireless receiver, or wireless transceiver. In an embodiment where the headset 104, 200 and SRD 106, 300 are connected by a wired connection, radio 224 may not be required, or may be required only to communicate with the backend computer system 110.

The radio 224 and antenna 226 may, for instance, be a radio suitable for short range communications, for example compatible or compliant with the BlueTooth protocol, which allows bi-directional communications (e.g., transmit, receive). Alternatively, the radio 224 and antenna 226 may take other forms, such as those compliant with one or more variants of the IEEE 802.11 protocols (e.g., 802.11n protocol, 802.11ac protocol). The radio 224 and antenna 226 may, for example, take the form of an RF communications card, received via a connector, for instance a PCMCIA slot, to couple the RF communications card to the controller 214. RF communications cards are commercially available from a large number of vendors. The range of the radio 224 and antenna 226 should be sufficient to ensure wireless communications in the expected work environment, for instance wireless communications with a processor-based speech recognition device 106 worn by a same user as wears the headset 200.

In an alternative embodiment, some or all of the electronic circuitry described above as being part of the headset 104, 200 may instead be placed on the SRD 106, 300. The circuitry of the SRD 106, 300 is discussed further immediately below.

Processor-Based Speech Recognition Device

FIG. 3 is a system diagram of an exemplary processor-based speech recognition device 300, according to one embodiment of the present system and method. The processor-based speech recognition device 300 may be similar to or even identical to the processor-based speech recognition device 106 of FIG. 1.

The processor-based speech recognition device 300 may include one or more controllers, for example a microprocessor 302 and DSP 304. While illustrated as a microprocessor 302 and a DSP 304, the controller(s) may take a variety of forms, for instance one or more microcontrollers, ASICs, PGAs, GRUs, and/or PLCs.

The processor-based speech recognition device 300 may include one or more non-transitory computer- or processor-readable storage media such as non-volatile memory 306 and volatile memory 308. Non-volatile memory 306 may take a variety of forms, for example one or more read-only memories (ROMs), one or more writeable memories, for instance EEPROM and/or or one or more FLASH memories. The volatile memory 308 may take a variety of forms, for example one or more random access memories (RAM) including static and/or dynamic random access memories. The various controllers 302, 304 and memories 306, 308 may be communicatively coupled via one or more buses (only one shown) 310, for instance instructions buses, data buses, address buses, power buses, etc.

The controllers 302, 304 may execute instructions stored in or by the memories 306, 308. The controllers 302, 304 may employ data, values, or other information stored in or by the memories 306, 308. The memories 306, 308 may for example store instructions which implements the methods described further below herein to distinguish user speech from background speech, as in exemplary methods 400 and 600 (see FIGS. 4 and 6). The controllers 302, 304, when implementing these instructions, thereby enable the speech recognition device 300, 106 to distinguish user speech from background speech.

The processor-based speech recognition device 300 optionally includes one or more radios 312 and associated antennas 314 (only one shown) operable to wirelessly communicatively couple the processor-based speech recognition device 300, 106 to the headset 200, 104. Such radio 312 and antenna 314 may be particularly suited to relatively short-range communications (e.g., 1 meter, 3 meters, 10 meters). The radio 312 and antenna 314 may take a variety of forms, for example a wireless transmitter, wireless receiver, or wireless transceiver. The radio 312 and antenna 314 may, for instance, be a radio suitable for short range communications, for example compatible or compliant with the Bluetooth protocol. The range of the radio 312 and antenna 314 should be sufficient to ensure wireless communications in the expected work environment, for instance wireless communications with a processor-based headset 104, 200.

The processor-based speech recognition device 300 optionally includes one or more radios 316 and associated antennas 318 (only one shown) operable to wirelessly communicatively couple the processor-based speech recognition device 300, 106 to the backend computer system/server 110 (FIG. 1), for example via one or more antennas 112 (FIG. 1) of a wireless network or communications system. The radio 316 and antenna 318 may take a variety of forms, for example a wireless transmitter, wireless receiver, or wireless transceiver. The radio 316 and antenna 318 may, for instance, be a radio suitable for relatively longer range communications (e.g., greater than 10 meters), for example compatible or compliant with one or more variants of the IEEE 802.11 protocols (e.g., 802.11n protocol, 802.11ac protocol) or WiFi protocol. In many applications, the range of the radio 316 and antenna 318 should be sufficient to ensure wireless communications in the expected work environment, for instance wireless communications with one or more antennas 112 (FIG. 1) positioned throughout the work environment, but this is not necessary.

General Speech Analysis Considerations

Note that the terms frames and fragments are used interchangeably throughout this specification to indicate information associated with a segment of audio. Also note that frames or fragments for the purposes of classification into user speech and background speech do not necessarily need to correlate one to one to frames or fragments generated for purposes of feature generation for other aspects of speech recognition, e.g., speech detection, training, decoding, or general background noise removal. They may have many different parameters, such as using different frame rates, amounts of overlap, number of samples, etc.

A speech recognition system attempts to map spoken human speech to known language vocabulary. To do so, a voice system will, among other operational elements, typically compare (i) received real-time speech against (ii) a stored audio template, also referred to as an audio characterization model ACM, of previously captured/analyzed voice samples. Such an audio template is derived from a collection of voice training samples and other training samples referred to, for the present system and method, as the training corpus TC.

In general, speech recognition may involves several general stages. Presented here is an exemplary general process for real-time speech interpretation.

(1) Conversion of received sound to digital signal—Audio waves emanating from a human speaker, as well as nearby sounds from other sources, are converted to an analog electrical signal. This may be done for example by a microphone 120, 202 in a headset 104, 200. The analog electrical signal is then digitalized, i.e., converted to binary 1's and 0's. This may be accomplished for example by the CODEC 208 of the headset 104, 200, or by the processor 302 of the speech recognition device 106, 300.

(2) Division of digitized sound into frames—The digitized sound is divided into frames, that is, segments of suitable length for analysis to identify speech. The length of segments may be geared to identify specific phonemes (sound units, such as a vowel sound or a consonant sound), or words or phrases.

NOTE: Further processing stages identified immediately below may be performed, for example, by the microprocessor 302 or digital signal processor 304 of the speech recognition device 106, 300, possibly based on instructions stored in non-volatile memory 306 or volatile memory 308. In an alternative embodiment, these tasks may be performed in whole or part by elements of headset 104, 200, or server 110.

(3) Conversion to frequency domain—The frames of the received, digitized audio signal are typically converted from the time domain to the frequency domain. This is accomplished for example via a Fourier transform or Fast Fourier transform, or similar processing.

(4) Conversion to secondary representation (state vectors)—In an embodiment, a frequency domain representation may be converted to other mathematical representations better suited for further processing. For example, while the frequency domain representation may be substantially continuous, various forms of concise representations may encapsulate the essential or key elements of the frequency domain representation. For example, amplitudes at various specific frequencies may be captured, or amplitudes of only the peak frequencies may be captured. Various other mathematical encapsulations are possible as well. The resulting mathematical characterization of the audio frames is sometimes referred to as "state vectors".

(5) Normalizations and other supplemental signal processing—One of the challenges inherent in voice recognition is that human voices differ in their harmonics and speech patterns; for example, the same exact word spoken by two different persons may sound dramatically different in a variety of respects, such as pitch, loudness, and duration, as well as variations due to age, accents, etc. To help compensate for this, voice systems typically attempt to normalize diverse samples of the same speech to similar mathematical representations. Thus, normalizations attempt to ensure that, for example, human vowel sounds (such as "ah", "eh", or "oh") coming from different speakers will all have a substantially similar mathematical representation, common to all speakers, during processing. The process of converting digitized speech samples from different speakers to a partially or substantially similar form is referred t as "normalization." A variety of established methods for this are known in the art.

In embodiments of the present system and method, one exemplary method of normalization is Vocal Length Tract Normalization (VTLN), which applies compensations for the varied pitches of the human voice (including, but not limited to, the typical differences between male and female voices). In alternative embodiments of the present system and method, another system of normalization which may be employed is Maximum Likelihood Linear Regression (MLLR), which adapts parameters within the stored template data to be a closer to match to a currently received sound signal.

Other signal conversions may be employed as well at various stages. For example, various frequency domains may be either boosted or suppressed.

(6) Comparison of received voice signal against the template—The processed, received voice signal is compared against a template of pre-processed, stored voice signals also referred to as an audio characterization model ACM. A favorable comparison is indicative of a user voice, which is accepted by the speech driven system 102; an unfavorable comparison is indicative of a background voice (or possibly a user voice which is corrupted by extraneous background sounds), and which is thereby rejected by the voice driven system 102.

Audio Characterization Model and Training Process

The audio characterization model ACM typically includes stored mathematical representations of human voices expressing certain words, for example storing the state vectors described above. The audio characterization model ACM also contains data which matches the stored audio signals to specific textual representations, i.e., textual transcriptions of the spoken words. The audio signal representations (state vectors) and textual transcriptions may be vowel or consonant sounds, whole words, phrases or sentence fragments, or even whole sentences. The comparison discussed above determines if the received voice signal is a match for a voice signal in the audio characterization model ACM (the stored audio template).

In an embodiment of the present system and method, a training corpus is prepared during a training phase which occurs in time prior to the release/use of the speech driven system 102 for field-use in factories, warehouses, or other industrial environments. The ACM (that is, the template) is prepared from the training corpus. Thus the audio characterization model ACM may be understood in part as a preset or pre-determined representation of correlations between audio signal representations (state vectors, etc.) and associated text, such as syllables, words, and/or phrases.

Training environment: In an embodiment of the present system and method, the audio vocabulary of the training corpus is initially recorded in a training environment which is the same as, or which mimics, an industrial environment in which the speech recognition device 106, 300 may be used. In this way, the audio samples in the training corpus are likely to be representative of audio samples which will be obtained from actual device users 100 during field operations. For example, if the speech recognition device 106, 300 is to be used in factory and warehouse settings, then the audio samples collected for training purposes may be collected in an actual factory or warehouse setting, or an environment designed to mimic such settings.

In one embodiment, the use of a field-realistic setting to record training sounds includes an environment which may have one or more of the following audio or acoustic aspects:

Background sounds from Public Address (PA) system voices. A factory, warehouse, or other industrial environment may include a public address system which delivers widely audible background speech at unpredictable times and/or of unpredictable content (for example, a generalized and unpredictable vocabulary).

Background voices from roving persons in the environment. In a factory, warehouse, or other industrial setting, the person using the speech recognition device 106, 300 will typically wear a headset 104 which is configured with a microphone 120 in immediate proximity to the user's mouth (see FIG. 1 above). However, other persons working in the industrial setting may also be nearby, and the microphone 120 will pick up their speech as well.

Background sounds from operating equipment and machinery in the environment. For example, a factory environment may have sounds which include the operations of manufacturing machines and conveyor belts, while a warehouse environment may have sounds which include forklifts and other devices for movement of heavy objects.

It will be understood by persons skilled in the art that, as detected by the microphone 120, background voices—for example those from a PA system or from roving persons—will have audio qualities which are distinctive from the audio qualities of a user 100 whose mouth is in immediate proximity to the microphone 120. Physiologically-based differences in the voices (between the user 100 and roving persons) also result in audio quality differences. It is a feature of the present system and method to distinguish a user voice from a background voice emitted from a PA system or from a roving person.

In an alternative embodiment, a training corpus may be obtained in an audio environment which is not the same as the field environment, for example, in a sound studio.

Training vocabulary: In an embodiment of the present system and method, the speech recognition device 106, 300 may be expected to be used principally in conjunction with a specific or well-defined vocabulary of terms. For example, it may be anticipated that users of the speech recognition device will principally speak terms associated with certain manufacturing processes or with certain warehouse procedures.

For example, the vocabulary may entail the use of digits or numbers, the names of certain specific procedures, and/or certain specific signal words or confirmation words for known tasks. In an embodiment, and in such cases, the vocabulary for the training corpus (and so, ultimately, for the audio characterization model ACM) may be principally confined to words, terms, or phrases which are expected/anticipated to be used by the users 100 of the speech recognition device 106, 300.

In an alternative embodiment, the vocabulary for the training corpus may be a substantially more extended vocabulary, including terms and phrases of broader general usage apart from the most commonly expected terms for the particular field environment.

"Training users" and generalized user audio training: In an embodiment of the present system and method, the training corpus is representative of selected word sounds or word phrases, as they may be potentially by spoken by many different individuals. This may include individuals of different genders, different ages, different ethnic groups, persons with varying accents, and in general people whose widely varying physiologies may result in a broad array of distinctive vocal qualities, even when voicing the same word or phrase.

In an embodiment, this may entail that during the training phase, multiple different persons, referred to here as training users, are employed to help create the training corpus. In an embodiment, each such person (that is, each training person) is present in the training environment (not necessary at the time same time). It is noted that, while the training users could be the same as some people who will use the speech driven system 102 in the field, more typically the training users are not actual users 100. In an embodiment of the present system and method, the training users may be selected to represent various typical users or generic users 100. In an alternative embodiment, the training users may be selected to be representative of certain expected sub-populations of typical users 100, for example male users or female users.

During training, each training user dons a headset 104 with microphone 120 (see FIG. 1). With suitable prompts, each training user speaks a designated training vocabulary. Training users may be directed to recite the vocabulary, or parts of the vocabulary, multiple times and/or at multiple places within the training environment.

In this way, and for a single word or phoneme (e.g., "one", "two", "confirmed", "stored", etc.) multiple redundant samples may be gathered from each training user. Each such audio sample may sometimes be collected with just the word and no background sounds, and at other times with varying elements of background sounds (PA sounds, other roving speakers, machine sounds) from the training environment. In addition, the same training samples, provided by the multiple different training speakers, results in redundancy in terms of having multiple voice samples of the same text.

Combined user voices and background sounds: As will be apparent from the above description, the collected voice samples from training users may include backgrounds sounds. In an embodiment of the present system and method, training users may be deliberately directed to utter some voice samples when little or no backgrounds sounds are present; and to speak other voice samples (including possibly redundant trainings vocabulary) when background sounds are present. As a result, the training corpus may include the same training vocabulary both with and without backgrounds sounds.

Digitization and normalization of the training voice samples: After collection of the voice samples in the training environment, the voice samples are digitized and combined into the training corpus, for example in the form of their raw audio spectrum. The audio characterization model ACM may contain the same audio samples in compressed forms, for example in the form of state vectors, or in other signal representations.

The process of integrating the audio samples into the audio characterization model ACM may include various forms of mathematical processing of the samples such as vocal length tract normalization (VLTN) and/or maximum likelihood linear regression (MLLR). In an embodiment of the present system and method, the result is that within the audio characterization model ACM, a digitized samples of a single training word (e.g., "one," "two," "three", etc.) may be normalized to represent a single, standardized user voice. In an alternative embodiment, within the training corpus a digitized sample of a single training word may be given multiple digital representations for multiple types of voices (for example, one representation for a generic female voice and one representation for a generic male voice).

In an embodiment of the present system and method, the audio characterization model ACM may include both one or more discrete samples of a given training word without backgrounds sounds; and one or more samples of the given training word with background sounds. In an alternative embodiment, the training corpus combines all instances of a training word into a single sample.

Transcribing and Marking the Training Corpus: In an embodiment of the present system and method, the digitized training corpus must be transcribed and tagged. This process entails have a training listener (or multiple training listeners) listen to the corpus. Each training listener is assigned to transcribe (via a keyboard action or mouse interaction with a computer, or similar) recognizable words or phrases, such as by typing the text of the recognizable words or phrases.

Further pre-field-use processing then includes combining the transcribed text digitally into the audio characterization model ACM. In this way, the finalized audio characterization model ACM includes both digital representations of recognizable audio; and, along with the digital representations, text of the associated word(s).

Acceptable and Unacceptable Articulations of Words: In addition, the training listener may be tasked to provide additional flags for sounds within the training corpus. This is also referred to as tagging. The present system and method pertains to distinguishing speech of a user of a voice recognition system from other speech which is background speech. In an embodiment of the present system and method, and during the training process, the training listener may flag (tag):

(i) Words or phrases in the training corpus which are deemed to be of adequate audio clarity—that is, the words or phrases can be readily understood by the training listener with little or no uncertainty—which are flagged by the training listeners as acceptable. Typically, this reflects that the words were spoken by a training user, and that upon hearing, the articulation of the words is not obscured by background voices or sounds.

(ii) Words or phrases in the training corpus which are deemed to be of poor audio clarity—that is, the words or phrases cannot be readily understood by the training listener, or can be only tentatively identified—and which are flagged by the training listeners as unacceptable. This typically reflects either (i) user speech which is obscured by excess background voices or other background sounds, or (ii) voices which are in fact background voices and not user speech.

(iii) Background sounds associated with the industrial environment, such as machine noises or sounds from transport vehicles, which may also be flagged as unacceptable.

Finalized Audio Characterization Model ACM: The finalized audio characterization model ACM includes multiple elements, which may include for example and without limitation:

(a) digital representations (e.g. state vectors) of audio based on user vocalizations for a selected vocabulary of words;

(b) text of the words associated with the vocalizations;

(c) digital representations of background sounds; and (d) flags to distinguish acceptable audio samples from unacceptable audio samples.

The digital representations of training audio may include representations of user speech samples which were detected along with simultaneous background sounds, such as PA system voices, roving person voices, and other background sounds. These digital representations may therefore be indicative of user speech combined with expected background sounds for the industrial environment.

Audio Feature Extraction and Quantization: Sound Characterizations, Audio Characterization Models and Rejection Threshold: In an embodiment of the present system and method, a further stage of the pre-field-use process includes establishing a sound characterization for each speech audio sample in the audio characterization model. The sound characterization is indicative of a standardized sound quality of each audio sample, and in an embodiment may be derived via one or more mathematical algorithms from the spectrum of the audio sample. For example, the sound characterization may be based on a VTLN of each speech sample. In an alternative embodiment, the sound characterization may be based on an MLLR of each speech sample. The collection of sound characterizations and related threshold data (discussed below) constitute the audio characterization model ACM for the audio environment.

In an alternative embodiment, the sound characterization may be based on one or more formants, such as the lower order ($1^{st}$, $2^{nd}$ and/or $3^{rd}$) formants, of each speech sample; it may be based on raw values of the formants, normalized values, spacing between formants, or other related calculations. (Speech formants are either the spectral peaks of a sound and/or the resonances associated with the spectral peaks.)

In an alternative embodiment, the sound characterization for each speech audio sample is not determined during pre-field-use processing; rather, spectral data is stored directly in the audio characterization model, and the sound characterizations in the model are calculated by the speech recognition device 106 during run-time, that is, during field use.

In an embodiment of the present system and method, a final stage of the pre-field-use process may include establishing a rejection threshold. In an embodiment, the rejection threshold may be a specific mathematical value which distinguishes acceptable user speech from un-acceptable user speech.

In an embodiment of the present system and method employment a neural network or other trained learning system, a final stage of the pre-field-use process may entail classifying the audio as one of "User Speech", "Background Speech", "PA Speech", with the possibility of also including a "Environment Noise" classification.

In embodiment of the present system and method, in field use, received vocalizations in the field (for example, in a factory or warehouse) may processed by either headset 104, 200 or by speech recognition device 106, 300 to obtain a real-time sound characterization of the received vocalization. The sound characterization for the received speech may be compared against a sound characterization stored in the audio characterization model ACM. If the difference between the two values is less than the rejection threshold, the received vocalization is construed to be user speech, and is accepted. If the difference between the two values is greater than the rejection threshold, the received vocalization is construed to not be user speech and is rejected.

In an embodiment of the present system and method, for speech in the audio characterization model ACM, explicit sound characterizations values and an explicit rejection threshold may be established during the pre-field-use processing.

Implicit Audio Characterizations Models, Implicit Rejection Threshold and Learning System Training: In an alternative embodiment of the present system and method, implicit values are used to characterize the training vocalizations, and for the rejection threshold.

In one exemplary embodiment, a machine learning system is trained to distinguish acceptable user speech from user speech that is not acceptable due to excessive background noise. The learning system may be hardware or software-based, and may include for example and without limitation: a neural network system, a support vector machine, or an inductive logic system. Other machine learning systems may be employed as well.

In one embodiment of the present system and method, machine learning such as neural network training may occur concurrently with transcription (as discussed above). In such an embodiment, the human trainer may be the same person or persons as the training listener. In an alternative embodiment, neural network training or other learning system training may be separate, pre-field-use process.

In general, machine learning entails presenting the learning system with data samples, and conclusions based on the data samples. The learning system then defines rules or other data structures which can substantially reproduce the same conclusions based on the same data samples.

For example, a neural network system may be presented with the training corpus, and asked to classify a newly presented voice sample against the training corpus as being either acceptable or unacceptable. The training process relies on a human trainer to define, in fact, the correct assessment (for example, the speech as being acceptable or unacceptable).

The machine learning system generates a provisional hypothesis, either that the newly presented voice sample is acceptable or unacceptable. The machine learning system presents the hypothesis (acceptable or not). The human trainer provides feedback to the learning system, either confirming the hypothesis (for example, that a voice sample which was predicted as being acceptable is in fact acceptable), or rejecting the hypothesis (for example, indicating that a voice sample which was predicted as being acceptable was, in fact, not acceptable).

Responsive to the feedback from the human trainer, the neural system modified internal data structures responsive to the feedback, and according to a suitable training/learning algorithm. For example, in the case of a neural network, the learning system modifies adaptive weights of neural links. Over time, with enough training, the result is a network which can significantly reproduce the desired outcomes as defined by the human trainer. For example, the learning system learns to distinguish acceptable user speech from unacceptable user speech, as it would be determined by a user.

As described above, a learning system therefore is trained to distinguish a level of difference between (i) a newly presented user voice sample and (ii) a training voice sample stored within the audio characterization model ACM. Beyond a certain level of difference, the user voice sample is deemed unacceptable. Therefore, in the finalized model of the neural network, there is at least an implicit rejection threshold beyond which received audio vocalizations are not acceptable. Similarly, the learning system establishes an implicit sound characterization for sound samples stored in the audio characterization model ACM. In field use, at least an implicit sound characterization is formed for received audio as well.

Further below in this document, reference will generally be made to sound characterizations, rejection thresholds, and more generally to the audio characterization model ACM which characterizes acceptable speech for the audio environment. It will be understand that the sound characterizations and rejection thresholds may be either explicit values, or may be implicitly stored as distributed parameters or data structures in a learning system such as a suitably trained neural network.

Figure 4:
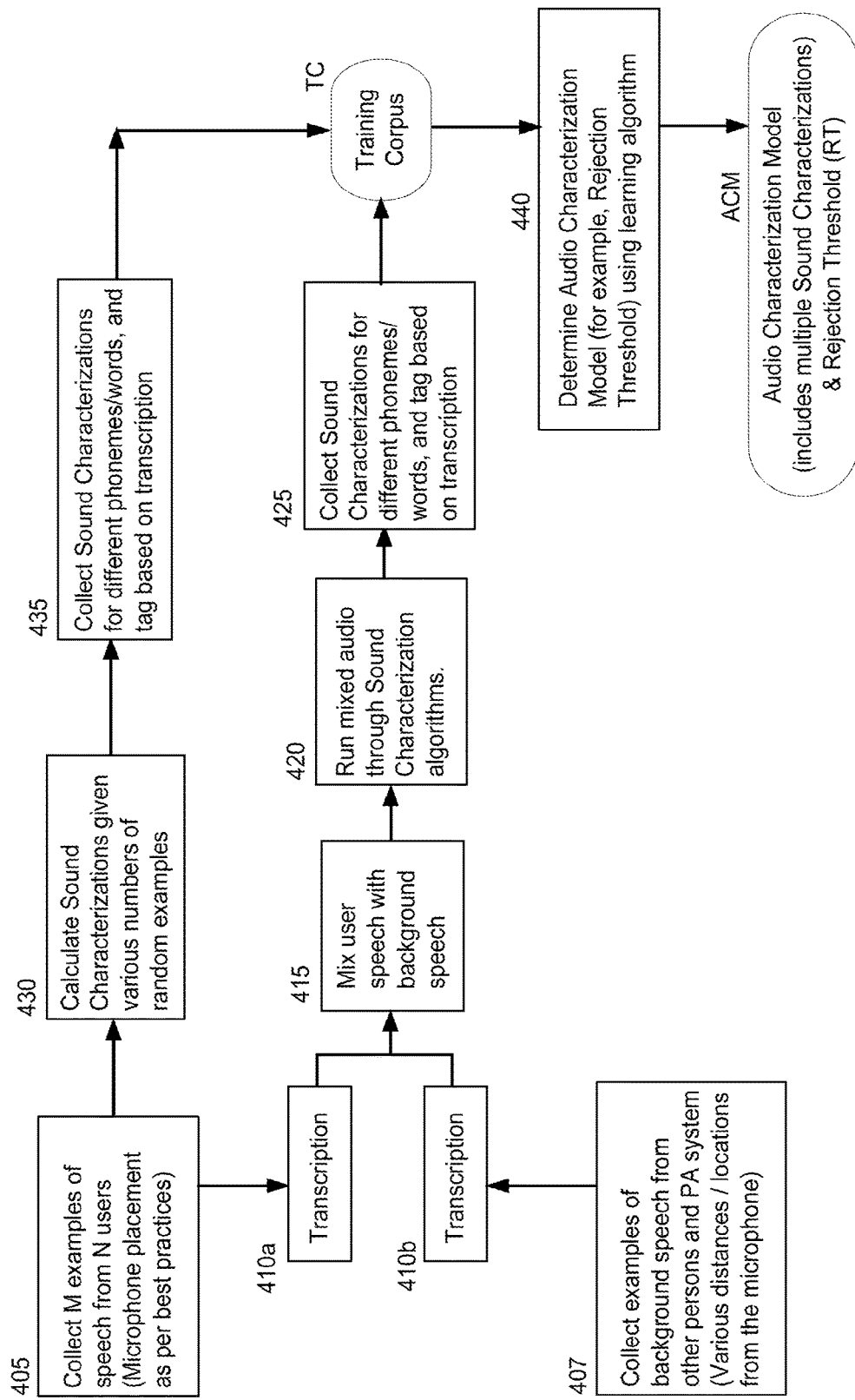
FIG. 4 is a flow-chart of an exemplary method for pre-field-use creation of a training corpus, audio characterization model, and rejection threshold for an exemplary speech-driven system, according to one embodiment of the present system and method.

Exemplary Pre-Field-Use Creation of Learning Corpus, Audio Characterization Model, and Rejection Threshold Via Learning Algorithm FIG. 4 presents a flow chart of an exemplary method 400 for pre-field-use creation of a training corpus TC, audio characterization module ACM, and establishment of a rejection threshold RT. The method is operable on one or more computer systems, for example one which may be similar to server 110 of FIG. 1, though the actual computer(s) used for training is (are) likely to be other than the server 110 of FIG. 1. Multiple computers may be employed, for example at different stages of the learning/training process. (For example, one or more computers may be employed during the audio collection phases 405, 407 described below, while one or more other computers may be employed during the transcription phases 410, mixing phases 415, and other phases or procedures described below.)

Some of the steps shown in method 400 may be performed in different orders, or in parallel. The order of presentation below is for convenience only, and should not be construed as limiting. The method may be performed in part or in whole in a training environment, as described above.

The method may begin at step 405. In step 405, training users are prompted to voice speech samples, for example, to recite samples of a limited vocabulary which is expected to be employed in field-use of the speech driven system 102. The training users are typically wearing headsets 104, 200, with microphones suitably placed near their mouths, as described above. The speech samples are collected from the microphones 120, 202 of the headsets, and may be stored on a computer system as audio files (or in one integrated audio file) for further processing.

In an embodiment of the present system and method, user speech samples may be collected with no background sounds present. In an alternative embodiment, user speech samples may be collected when backgrounds sounds are always present (that is, audible and concurrent in time) as well. In an alternative embodiment, user speech sounds may be collected both with and without background sounds being present.

In step 407, audio samples are collected, via the user headsets 104, 200 as worn by the training users, of backgrounds sounds in the training environment. The backgrounds sounds emanate from other persons in the training environment, that is, persons other than the training user wearing the headset. The background voices may be recorded from persons at varying distances and in varying positions in relation to the user and the headset 104, 200.

In steps 410a and 410b (collectively, 410), the recordings of the audio samples are transcribed by the training listeners, including both transcriptions of user voice samples and transcriptions of background voice samples.

In step 415, some or all of the audio user speech samples may be mixed with audio of background speech samples. In this way, audio representations may be created which were not actually heard in the training environment. For example, a single training word spoken by users (for example, a word such as "three" or "selected") can be mixed with multiple different background sounds.

In an embodiment, multiple such samples may be created with, for example and without limitation: a single user word mixed with single different backgrounds sounds; a single user word mixed with multiple concurrent background sounds; and a single user word mixed with background sounds at different relative sound levels between the user sound and the background sound. In this way, many multiple realistic samples of user speech with background speech can be created from a limited set of samples initial.

In step 420, the present system and method calculates sound characterizations for the various combined user-voice/background-speech audio samples. As per the discussion above, the sound characterizations may be VTLNs of each sample, an MLLR of each sample, or other mathematical characterizations. In an embodiment of the present system and method, the VTLN values for users can be refined over time; as additional user voice samples are collected during field use (see FIGS. 5 and 6 below), the training corpus can be revised and redistributed to the various speech recognition devices 106 in the field.

In step 425, the present system and method collects the sound characterizations for the different phonemes or words, and tags them based on the transcriptions, thereby creating part of the training corpus TC. The tags may include the text representation associated with the audio or other text indicator (that is, an indicator of meaning) associated with the audio; and the tag may also include the determined quality indicator of "acceptable" or "unacceptable". For some audio samples, the training listener may be unable to determine the spoken words, in which case only a quality tag or quality indicator may be provided.

Returning to step 405, where the speech samples were collected from training users, in step 430, the present system and method calculates sound characterizations for the various user voice samples. As per the discussion above, the sound characterizations may be VTLNs of each sample, an MLLR of each sample, or other characterizations.

In an embodiment of the present system and method, in step 430 it is possible to use VTLN factors calculated given various examples for a given user in place of the current VTLN factor for each example. This increases the number of examples by the number of pre-calculated VTLN factors used.

In step 435, the present system and method collects the sound characterizations for the different user phonemes or words, and tags them based on the transcriptions, thereby creating part of the training corpus TC. The tags may include the text representation associated with the audio or other text indicator (that is, an indicator of meaning) associated with the audio; and the tag may also include the determined quality indicator of "acceptable" or "unacceptable".

In an embodiment where the user voice samples are collected without background sounds, it is expected that most or all of the user voice samples will be of sufficient clarity to be acceptable and to be transcribed. However, any such user voice samples which are not sufficiently clear may be tagged as unacceptable. In an embodiment where some or all user voice samples are collected with background sounds present, it is expected that at least some audio samples will not be fully intelligible, in which case only a quality tag or quality indicator may be provided.

The training corpus TC consists of all the tagged, transcribed audio samples, possibly with suitable condensation (for example, multiple samples of the same word or the same phoneme may be condensed to one representation).

In step 440, the present system and method determines a suitable audio characterization model ACM and Rejection Threshold RT. The audio characterization model ACM includes sound characterizations for multiple words, phrases, and/or phonemes. In an embodiment, and as described above, this may entail training a learning system to distinguish acceptable voice samples from unacceptable voice samples, and thereby having the learning system establish a suitable rejection threshold (either explicit or implicit).

Audio Environment in Field-Use

Figure 5:
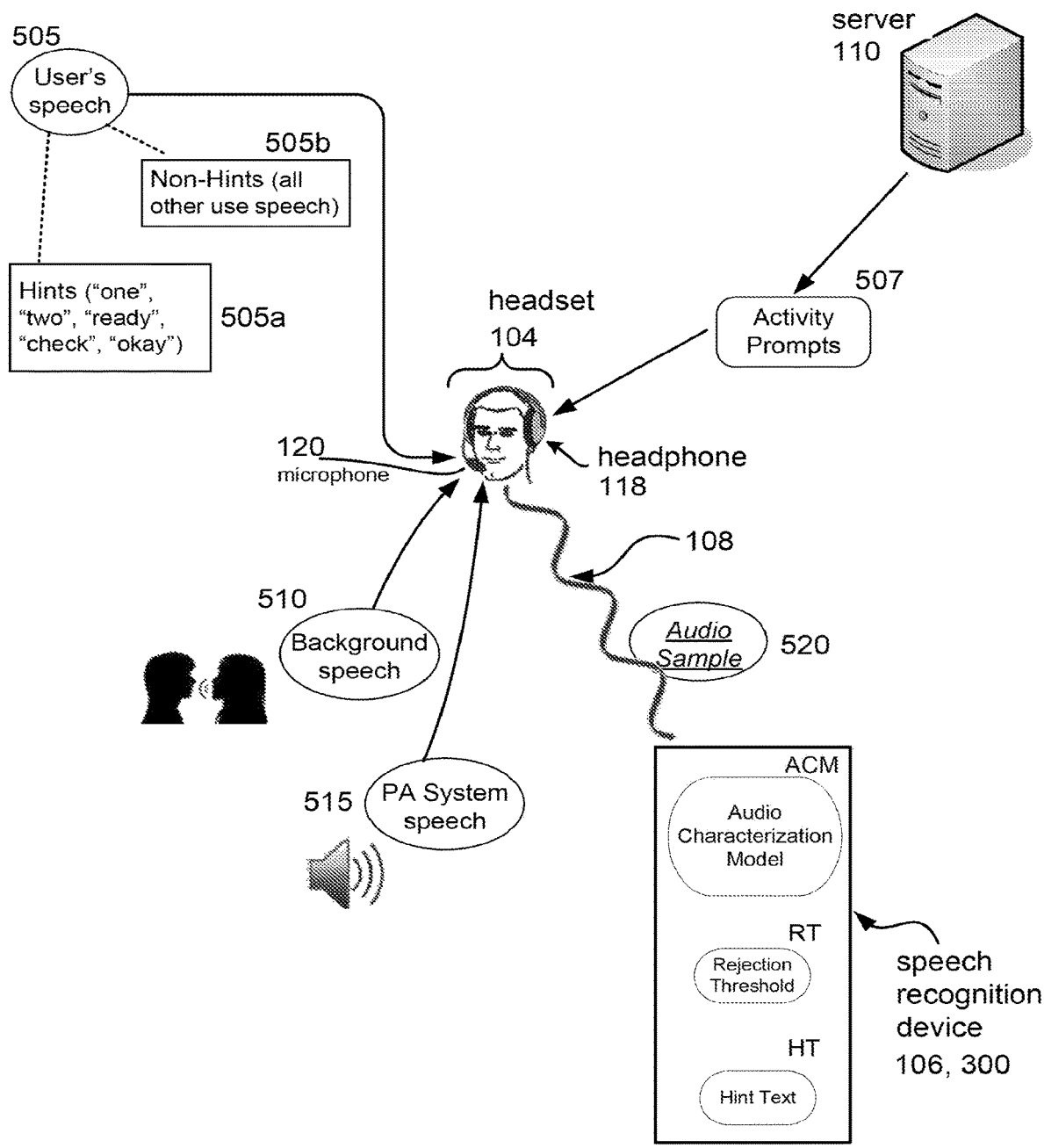
FIG. 5 illustrates an exemplary audio-environment for a deployment and field-use of an exemplary headset and exemplary speech recognition device according to an embodiment of the present system and method.

FIG. 5 illustrates an exemplary audio environment 500 for field use of a speech-drive system 102 including a headset 104, 200 and speech recognition device 106, 300. Such an environment may be present for example in a factory, a warehouse, or other industrial environment where the speech-driven system 102 may be employed.

The audio environment may include activity prompts 507 or other prompts which are provided to the user 100 from the SRD 106, 300 (sometimes via an application running on the SRD, and other times originating from server 110), and which the user 100 hears via headphones 118 of headset 104. These prompts may include instructions for field activity, such as selecting certain items from specified locations or bins in a warehouse, or may include prompts for certain manufacturing activities such as stages in assembly of some hardware. The prompts may include prompts to the user to speak certain words specifically for audio-training purposes (see for example step 602 of method 600, FIG. 6 below).

In response to prompts, the user 100 may either speak certain expected, prompted responses 505a, or perform certain activities, or both. For example, a prompt 507 may tell a user to pick an item from a bin numbered "A991". In response, the user may be expected to recite back the words "'A' nine nine one", then actually pick the item from a bin numbered "A991", and then recite some confirmation phrase such as "picked" or "selected."

Hinted user speech and non-hinted user speech—In general, the user's speech 505 comprises both: (i) some speech in response to prompts, where a specific response or specific choices of response to the prompt is/are expected from the user, and which is referred to as hinted speech 505a; and (ii) all other user speech 505b, which is non-hinted user speech. Some prompted responses are hinted, which occurs in specific parts of the user's workflow (for example, when the user is prompted to select a particular part from storage). Hinted speech will have an expected value for a reply, which is typically a dynamic value that is associated with the task at hand (for example, a part number).

Non-hinted speech 505b may include general conversation which the user engages in with other persons, as well as some requests or other data provided to the server 110 by the user 100. All user speech 505 is detected by microphone 120 of headset 104.

Speech detected by microphone 120, 105 in the field will also typically include background speech 510 from other persons in the area, and PA system speech 515.

Stored data on speech recognition device: In embodiment of the present system and method, all collected sounds—user speech 505, background speech 510, and PA system speech 515, as well as other background sounds (not illustrated) are transmitted or passed from headset 104 as audio samples 520 to the speech recognition device (SRD) 106, 300.

In an embodiment of the present system and method, the SRD 106, 300 is pre-programmed with, pre-configured with, and or/stores both a suitable audio characterization model ACM and/or training corpus TC for the current industrial environment, and a suitable rejection threshold TC.

In an embodiment, SRD 106, 300 is also pre-programmed with, pre-configured with, and/or stores a vocabulary of hint text HT expected to be used in the field. In an alternative embodiment, some or all of the audio characterization model ACM, training corpus TC, rejection threshold RT, and/or Hint Text HT may be prepared or stored on server 110 (for example, at the factory or warehouse where the SRD is to be used).

Exemplary Method of Field-Use of the Speech Recognition Device

Figure 6:
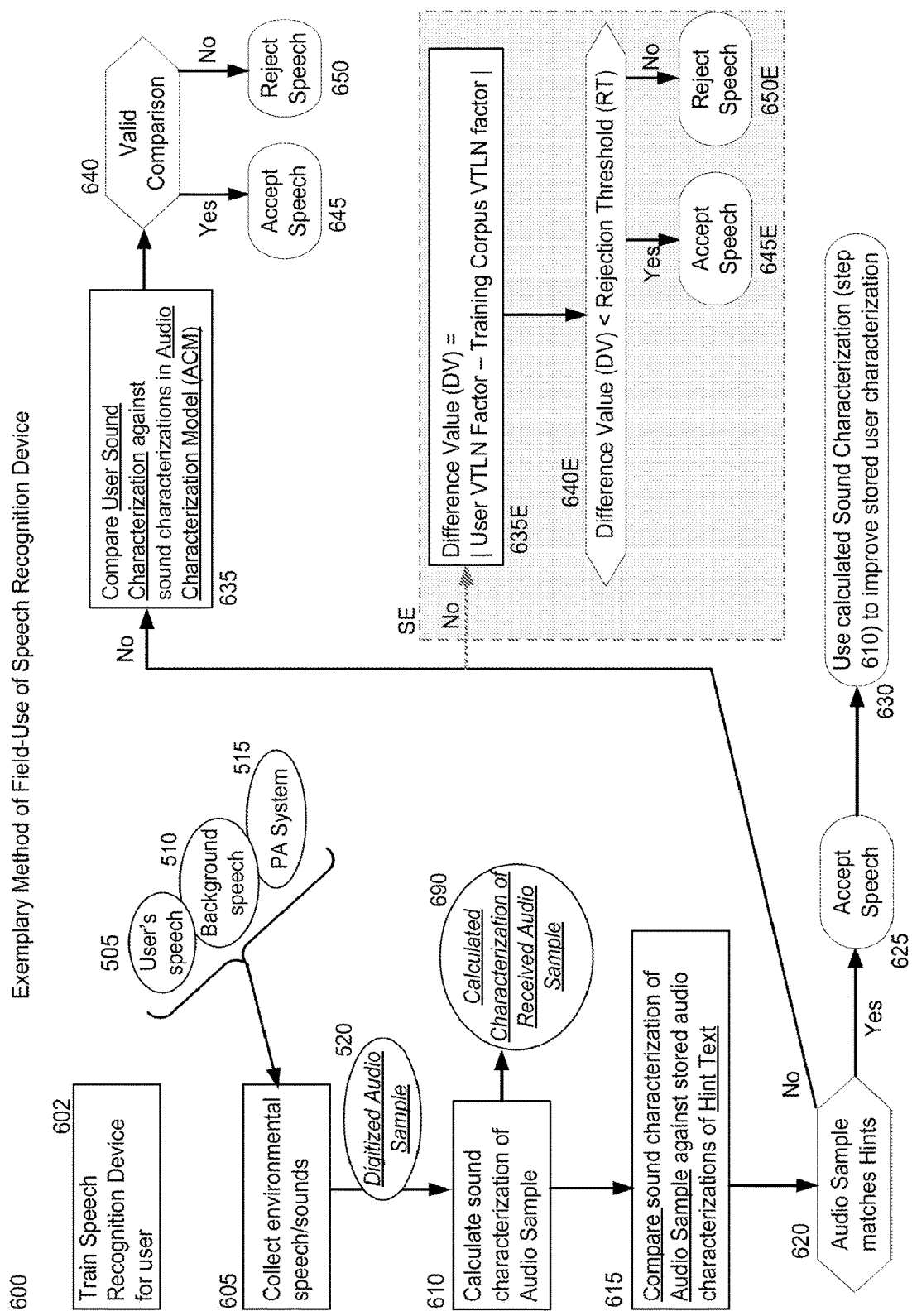
FIG. 6 is a flow-chart of an exemplary method of field-use of an exemplary speech recognition device for distinguishing user speech from background speech.

FIG. 6 illustrates an exemplary method 600 of field-use of a speech-driven system 102. In an embodiment, the method is operable in a warehouse, factory, or other industrial setting with an audio environment the same or similar to exemplary field-use audio environment 500 (see FIG. 5 above).

The method 600 begins with step 602, which entails training the speech recognition device (SRD) 106, 300 to be operable with a particular user 100, by recognizing the voice of the user 100. In an embodiment, step 602 is a field-use step, but is a one-time step and is performed preliminary to the main use of the SRD 106, 300 to support user activity in the field.

In an embodiment, the training of the speech recognition device may entail prompting the user to speak specific, expected words, typically a limited vocabulary of words which the user will employ in the course of work. These prompted words may include digits, numbers, letters of the alphabet, and certain key words which may be commonly used in a given setting, for example, "Ready", "Okay", "Check", "Found", "Identified", "Loaded", "Stored", "Completed", or other words which may indicate a status of a warehouse or factory activity. In an embodiment, the prompted words may include some or all of the words expected to be used as hint words 505a during field use (see FIG. 5 above).

The user is prompted to speak these words (typically one word at a time), and the user then speaks the prompted words in reply. The SRD 106, 300 records the user replies and digitizes them. In an embodiment, the SRD 106, 300 may calculate for each word a set of state vectors and/or sound characterizations, employing calculations in a manner similar to that of pre-field use processing (see FIG. 4 above).

In an embodiment of the present system and method, state vectors and/or sound characterizations obtained during training step 602 may be used to modify the current user characterization and/or the rejection threshold RT which is stored on the SRD 106, 300.

Routine or on-going field-use of the SRD may commence with step 605. In step 605, the headset 104 functions interactively with the user 100 and the larger audio environment 500. Prompts 507 for user activity may be provided via headphones 104. The prompts 507 may originate, for example, on server 110. Responsive to the prompts 507, the user 100 may engage in various appropriate activities, such as for example picking stock items from prompted locations, moving stock items to prompted locations, or other activities. Responsive to the prompts and to their own activity, the user may also speak various words 505. These user-spoken words 505 or phrases may for example confirm recognition of a prompt, or may confirm completion of a task, or may confirm identification of a location or object.

The user spoken words 505 are detected by microphone 120, 200 of headset 104. Microphone 120, 200 may also detect background speech 510 from other persons present in the environment, as well as PA system speech 515, and other background sounds.

In an embodiment, step 605 may entail creation of digitized audio samples, packets, or frames 520, which may include user speech 505, background speech 510, PA system speech 515, and other sounds, either concurrently or serially. In an embodiment, the digitized audio samples 520 are passed from headset 104 to SRD 106.

In step 610 the SRD 106 calculates a suitable sound characterization 690 of the audio sample 520. Suitable sound characterizations are those which are comparable to those stored in the training corpus TC. For example, suitable sound characterizations may include VTLNs of an audio sample 520, or MLLRs of an audio sample 520. Other sound characterizations, suitable to match those of training corpus TC, may be employed as well.

Comparison of Received Sound with Hint Text: In one embodiment of the present system and method, in step 615 the method compares the received audio sample 520, and/or the sound characterization of the received audio sample 690, against stored sound characterizations of the hint text HT.

In step 620, a determination is made if the received audio sample 520, 690 matches any of the words in the hint text HT. If the received audio sample 520, 690 matches hint text HT, then it is presumed that the audio sample 520, 690 comes from a valid user 100, and further processing with respect to possible background speech may be skipped. In this event, the method proceeds to step 625 (along the path marked "Yes" in the figure), where the received audio sample 520, 690 is accepted.

In an embodiment of the present system and method, the SRD 106, 300 may also at some times be running in a field training state or a noise sampling state. In such a training or noise-sampling state, then at step 620 (and whether or not the received audio sample 520 matched the hint text HT) the method would automatically accept the user speech; the method would then automatically proceed to steps 625 and 630, discussed immediately below.

In an embodiment of the present system and method, from step 625 the method may proceed to step 630. In step 630, the present system and method uses calculated sound characterization 690 to improve the stored user sound characterizations and/or the audio characterization model ACM. For example, the state vectors which characterize user speech in the training corpus TC may be refined based on actual speech from actual users in the field. In an embodiment, this refinement of the training corpus TC may occur in the field in substantially real-time, with the sound characterizations in the training corpus TC being updated in real-time.

In an embodiment of the present system and method, each time the user 100 powers up the SRD 106, 300, the system starts over in building the characterization for that specific user. In an alternative embodiment, the SRD 106, 300 may persist the user characterization across power cycles (for example, storing the characterization in memory 306), so it is not necessary to start over each time. This specific characterization would not be stored in the audio characterization model (ACM).

In an alternative embodiment, user sound characterizations 690 collected in the field may be stored on server 110 or another suitable storage medium; the collected user sound characterizations 690 may then be processed en masse, using methods the same or similar to those of method 400 (FIG. 4, above).

Returning now to step 620, it may be the case that the received audio sample 520 and/or the sound characterization 690 of the received speech does not match any of the vocabulary in the stored list of hint text HT. In that event, the method continues with step 635 (along the path marked "No" in the figure).

In step 635, the present system and method compares the sound characterization 690 of the received audio sample against sound characterizations in the audio characterization model ACM. The comparison searches for an acceptably close match, but also determines a quality level of the match. In step 640, a determination is made as to whether the match is of acceptable quality. If the match is of acceptable quality (the path marked "Yes"), then in step 645 the speech is accepted as user speech. If the match is not of acceptable quality (the path marked "No"), then in step 650 the speech is rejected as not being user speech. As described above, in an embodiment such a determination made be made by a suitably trained learning system such as a neural network system trained as described above in this document (see for example FIG. 4 and associated discussion).

Shown in the figure is a supplemental example SE which illustrates one possible particular embodiment of steps 635 through 650. In step 635E (corresponding to step 635), a difference value DV is calculated as the absolute value of the difference between the VTLN of the received audio sample 690 and the VTLN factor of a suitable audio example in the training corpus TC.

In step 640E (corresponding to step 640), a determination is made as to whether the difference value DV is less than the rejection threshold RT. If the match is of acceptable quality (so that the difference value DV is less than the rejection threshold RT), then in step 645E the speech is accepted as user speech. If the match is not of acceptable quality (so that the difference value DV is greater than the rejection threshold RT), then in step 650E the speech is rejected as not being user speech.

As will be appreciated by persons skilled in the art, once an audio sample has been approved as acceptable speech, the meaning of the audio sample may be determined (based for example on transcription data in the training corpus TC). Based on the meaning of the received audio sample, suitable further actions may be taken by the speech driven system 102.

In an alternative embodiment of the present system and method, steps 615 and 620 (pertaining to the hint text comparison) may be omitted, along with omission of steps 625 and 630. In such an embodiment, control may pass directly from step 610 to step 635, 635E.

Summary and Alternative Embodiments

In an embodiment of the present system and method, a comparison is made between a real-time speech sample and pre-established sound samples. The pre-established sound samples are indicative of acceptable user vocalizations, and also indicative of unacceptable vocalizations—that is, vocalizations which are due to background voices, PA systems, or due to user vocalizations but which may be unintelligible due to concurrent background sounds.

A suitable metric is defined to analytically or numerically characterize the sameness or difference of the real-time speech sample against the pre-established sound samples.

If a sound property of a real-time speech sample is sufficiently close or similar to the sound properties of the pre-established samples which are indicative of user voices, the real time-speech sample is categorized as being acceptable user speech.

If the sound property of the real-time speech sample is not sufficiently close or not sufficiently similar to the sound properties of the pre-established samples which are indicative of user voices, the real time-speech sample is categorized as being unacceptable background speech.

The level of closeness or difference between a real-time sound sample and the stored sound samples is determined with relation to a suitable threshold value.

Audio Comparison Matrix: In an embodiment, to distinguish user speech from background speech, the present system and method may employ a stored, audio-derived data structure which incorporates sound data as a basis for comparisons. In one embodiment, the audio data structure may be a sound matrix, or an array of sound characterizations. Some cells in the audio matrix tend to characterize sounds which are valid user voice sounds, while other audio matrix cells tend to characterize sounds which are background voice sounds.

In real-time, newly recorded sounds are compared against cells in the audio matrix. Incoming vocalizations which compare favorably with valid user vocalizations in the sound matrix are considered to be acceptable user speech; incoming vocalizations which do not compare favorably with valid vocalizations in the matrix are rejected.

In some embodiments, the number of different available, stored voice characterizations may be too many to store in a matrix or array; or the voice characterizations may blend to a degree that does not lend towards distinguishing the characterizations as discrete, one-cell-per-one sound characterization storage. Instead, other comparison methods, based on mathematically continuous representations of voice characterizations, may be employed.

Thus, in various embodiments, signal matching and comparison methods may employ other data structures than a matrix of sound characterizations to make a comparison. A variety of signal processing techniques and artificial intelligence techniques, including neural networks and other learning system techniques, may be used to compare real-time field vocalizations against data stored in distributed or other forms in the learning system.

Further Embodiments

In further embodiments, labeled A1 through A10, the present system and method may also be characterized as:
A1. A speech recognition device (SRD) configured for recognition of human speech, comprising:
a microphone for receiving audio input;
a memory; and
a hardware processor communicatively coupled with said microphone and said memory, wherein said hardware processor is configured to:
identify in said received audio input a vocalization of a human language; and
categorize said received vocalization of a human language as either one of:
a first vocalization originating from a user of the SRD; or
a second vocalization originating from a background speech in the vicinity of the SRD.
A2. The SRD of embodiment A1, wherein:
said memory is configured to store an audio characterization model comprising:
a plurality of user speech samples; and
a background speech sample; and
said hardware processor is configured to categorize said received vocalization based on a comparison of the received vocalization with the stored audio characterization model.
A3. The SRD of embodiment A2, wherein:
the stored audio characterization model further comprises an audio mix with concurrent sound of:
a user speech sample of the plurality of user speech samples; and
the background speech sample; and
said hardware processor is configured to categorize said received vocalization based on a comparison of said received vocalization with said audio characterization model.
A4. The SRD of embodiment A3, wherein the memory is configured to store a speech rejection threshold; and
the hardware processor is configured to:
compute a speech difference between the received vocalization and the audio characterization model;
categorize the received vocalization as the first vocalization originating from the user of the SRD if an absolute value of the speech difference is less than the speech rejection threshold; and
categorize the received vocalization as the second vocalization originating from a background speech if the absolute value of the speech difference is greater than the speech rejection threshold.
A5. The SRD of embodiment A4, wherein said speech rejection threshold comprises a pre-determined threshold calculated based on at least one of:
training samples of user speech; and
training samples of background speech.
A6. The SRD of embodiment A5, wherein said speech rejection threshold is dynamically updated in field-use based upon the first vocalization originating from the user of the SRD.
A7. The SRD of embodiment A2, wherein:
the memory is configured to store as the audio characterization model a normalized user speech;
the hardware processor is configured to normalize the received vocalization; and
the comparison comprises a comparison of the normalized user speech and the normalized received vocalization.
A8. The SRD of embodiment A1, wherein said hardware processor is configured to:
determine if the received vocalization matches an expected verbalization from among a vocabulary of one or more expected verbalizations;
upon determining that the received vocalization matches the expected verbalization, categorize said received vocalization as the first vocalization originating from the user of the SRD; and
upon determining that the received vocalization does not match any of the one or more expected verbalizations, categorize said received vocalization based on a comparison of the received vocalization with a stored characterization of user speech for the SRD.
A9. The SRD of embodiment A8, wherein a vocabulary of one or more stored expected verbalizations comprises a voiced word sample collected from the SRD user in the field.
A10. The SRD of embodiment A1, further comprising a pre-trained learning system, wherein said pre-trained learning system comprises at least one of:
a set of rules determined in training to distinguish user speech from background speech, based on a data set of training user speech and training background speech; and
a set of weighted connections of a neural network system, said weighted connections determined in training to distinguish user speech from background speech based on the data set of training user speech and training background speech;
wherein said pre-trained learning system is configured to process said received audio input according to the at least one of the set of rules and the set of weighted connections, and wherein said pre-trained learning system categorizes said received vocalization as either one of the first vocalization or the second vocalization.

Persons skilled in the relevant arts will recognize that various elements of embodiments A1 through A10 can be combined with each other, as well as combined with elements of other embodiments disclosed throughout this application, to create still further embodiments consistent with the present system and method.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Patent No. D716,285;
U.S. Design Patent No. D723,560;
U.S. Design Patent No. D730,357;
U.S. Design Patent No. D730,901;
U.S. Design Patent No. D730,902;
U.S. Design Patent. No. D733,112;
U.S. Design Patent No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;

U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;

U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a *Laser Scanning Module Employing an Elastomeric U-Hinge Based Laser Scanning Assembly*, filed Feb. 7, 2012 (Feng et al.);
U.S. patent application Ser. No. 29/458,405 for an *Electronic Device*, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for *Indicia-reader Having Unitary Construction Scanner*, filed Jan. 8, 2014 (Colavito et al.);
U.S. patent application Ser. No. 14/200,405 for *Indicia Reader for Size-Limited Applications* filed Mar. 7, 2014 (Feng et al.);
U.S. patent application Ser. No. 14/231,898 for *Hand-Mounted Indicia-Reading Device with Finger Motion Triggering* filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for *Docking System and Method Using Near Field Communication* filed Apr. 21, 2014 (Showering);
U.S. patent application Ser. No. 14/264,173 for *Autofocus Lens System for Indicia Readers* filed Apr. 29, 2014 (Ackley et al.);
U.S. patent application Ser. No. 14/277,337 for MULTI-PURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. Patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);
U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent Application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary data structures, and examples. Insofar as such block diagrams, flow charts, schematics, exemplary data structures, and examples contain one or more functions and/or operations, it will be understood by those skilled in the art that each function and/or operation within such block diagrams, flowcharts, schematics, exemplary data structures, or examples can be implemented, individually and/or collectively, by a wide range of hardware, software, firmware, or virtually any combination thereof.

In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the control mechanisms taught herein are capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined to provide further embodiments. These and other changes can be made to the present systems and methods in light of the above-detailed description. In general, in the following claims, the terms used should not be construed to limit the invention to the specific embodiments disclosed in the specification and the claims, but should be construed to include all voice-recognition systems that read in accordance with the claims. Accordingly, the invention is not limited by the disclosure, but instead its scope is to be determined entirely by the following claims.

The invention claimed is:

1. A method of speech recognition, the method comprising:
    receiving at a microphone of a speech recognition device (SRD) an audio input; determining if the received audio input is a vocalization that matches an expected verbalization from amongst a vocabulary list of expected verbalizations;
    in response to determining that the received audio input matches the expected verbalization within the vocabulary list, categorizing the received audio input as a user speech originating from an operator of the SRD;
    in response to determining that the received audio input does not match any of the expected verbalizations within the vocabulary list, comparing the audio input with an audio template comprising audio characterizations of a plurality of sound samples comprising at least one of: user speech samples, background speech samples, background environmental sound samples; and
    determining that the received audio input to be one of: the user speech or background speech.

2. The method of claim 1, wherein the background speech is at least one of: a speech originating from a person other than the operator of the SRD or a background environmental sound.

3. The method of claim 1, wherein, the audio template further comprises a plurality of state vectors representative of a plurality of sound samples and wherein the method further comprises:
    calculating, an input state vector representative of the received audio input;
    calculating a speech difference value between the input state vector and the plurality of state vectors of the audio template;
    determining based on the calculation, the received audio input to correspond to the user speech originating from the user of the SRD if an absolute value of the speech difference is less than a user speech rejection threshold; and
    determining the received audio input to be at least one of: a background speech or a background environmental sound if the absolute value of the speech difference is greater than the user speech rejection threshold.

4. The method of claim 3, wherein the user speech rejection threshold is predetermined based on processing at least one of:
    training samples of user speech; and
    training samples of background speech.

5. The method of claim 1, further comprising:
    prompting the operator of the SRD for a specified word sample and collecting via the microphone of the SRD a vocalization of the specified word sample from the operator of the SRD; and
    storing in the memory the collected word sample, wherein said vocabulary list of expected verbalizations comprises the vocalization of the collected word sample.

6. The method of claim 5, further comprising using at least one of: a speaker of the SRD and a display of the SRD in prompting the operator of the SRD for a specified word sample.

7. The method of claim 1, further comprising, creating a portion of training corpus based on collection of sound characterizations for different user phenomes and tagging of the different user phenoms based on transcriptions.

8. The method of claim 1, further comprising, constructing an audio characterization model based on at least one of:
    discrete samples of a given training word without backgrounds sounds; and
    samples of a given training word with background sounds.

9. The method of claim 8 further comprises, constructing audio characterization model by using various forms of mathematical; processing of the samples such as vocal length tract normalization and/or maximum likelihood linear regression.

10. The method of claim 1, wherein the audio template comprising audio characterizations of a plurality of sound samples comprises at least one of:
    (a) digital representations (e.g. state vectors) of audio based on user vocalizations for a selected vocabulary of words;
    (b) text of the words associated with the vocalizations;

(c) digital representations of background sounds; and
(d) flags to distinguish acceptable audio samples from unacceptable audio samples.

11. The method of claim 1, wherein the audio characterization model comprises representations of user speech samples which were detected along with simultaneous background sounds and wherein the representations of the user speech samples comprises at least one of: voice of a public address system, a roving person voice, and Other background sound.

12. The method of claim 1, further comprising comparing said received audio input with the audio template according to at least one of:
   a set of rules of a pre-trained learning system of the SRD, wherein the set of rules was determined to distinguish user speech from background speech based on a data set of training user speech and training background speech; and
   a set of previously established weighted connections of a neural network system of the SRD, wherein said weighted connections were determined in training to distinguish user speech from background speech based on the data set of training user speech and training background speech.

13. A speech recognition system comprising:
   a headset comprising:
      a microphone configured to receive an audio input; and
      a speaker configured to provide a sound output; and
   a processor communicatively coupled to the headset, the processor configured to:
      determine a matching of the audio input received at the microphone with a vocabulary list;
      determine the received audio input to correspond to at least one of a user speech if it matches with the vocabulary list originating from a user of the headset or a background speech if it does not match with the vocabulary list; and
      comparing the audio input with an audio template comprising audio characterizations of a plurality of sound samples comprising at least one of user speech samples, background speech samples, background environmental sound samples if the audio input does not match with vocabulary list.

14. The system of claim 13, wherein the headset has a circuitry which incorporates audio processing circuits for tasks such noise suppression and modeling, feature vector generation, decoding and other correlation circuitry associated with speech detection and/or speech recognition.

15. The system of claim 13, wherein the headset comprises one or more audio coder/decoder coupled to microphone(s) to process analog signals from the microphone and produce digital signals representative of the analog signals.

16. The system of claim 15, wherein the processor is configured to determine that the received audio input matches with the expected verbalizations from among a vocabulary of one or more expected verbalizations stored in the memory.

17. A non-transitory computer readable medium comprising a set of instructions that are executable by a processor to:
   receive an audio input;
   determine if the received audio input is a vocalization that matches an expected verbalization,
   in response to determining that the received audio input matches an expected verbalization, categorize the received audio input as a user speech
   in response to determining that the received audio input does not match any of the expected verbalizations, compare the audio input with an audio template comprising audio characterizations of a plurality of sound samples comprising at least one of user speech samples, background speech samples, background environmental sound samples; and
   determine that the received audio input to be one of: the user speech and a background speech.

18. The non-transitory computer readable medium of claim 17 wherein the background speech comprises at least one of: a speech originating from a non-user and a background environmental sound.

19. The non-transitory computer readable medium of claim 17 wherein the audio template comprises at least one of:
   (e) digital representations (e.g. state vectors) of audio based on user vocalizations for a selected vocabulary of words;
   (f) text of the words associated with the vocalizations;
   (g) digital representations of background sounds; and
   (h) flags to distinguish acceptable audio samples from unacceptable audio samples.

20. The non-transitory computer readable medium of claim 17, further comprising a set of instructions that are executable by the processor, to construct an audio characterization model based on at least one of:
   a) both one or more discrete samples of a given training word without backgrounds sounds; and
   b) one or more samples of the given training word with background sounds.

* * * * *